June 25, 1968  S. BOSWORTH ET AL  3,390,327
CALIBRATION DEVICE FOR ELECTRICAL INSTRUMENTS HAVING AN
ERROR PERCENTAGE INDICATOR
Filed Nov. 5, 1964  3 Sheets-Sheet 1
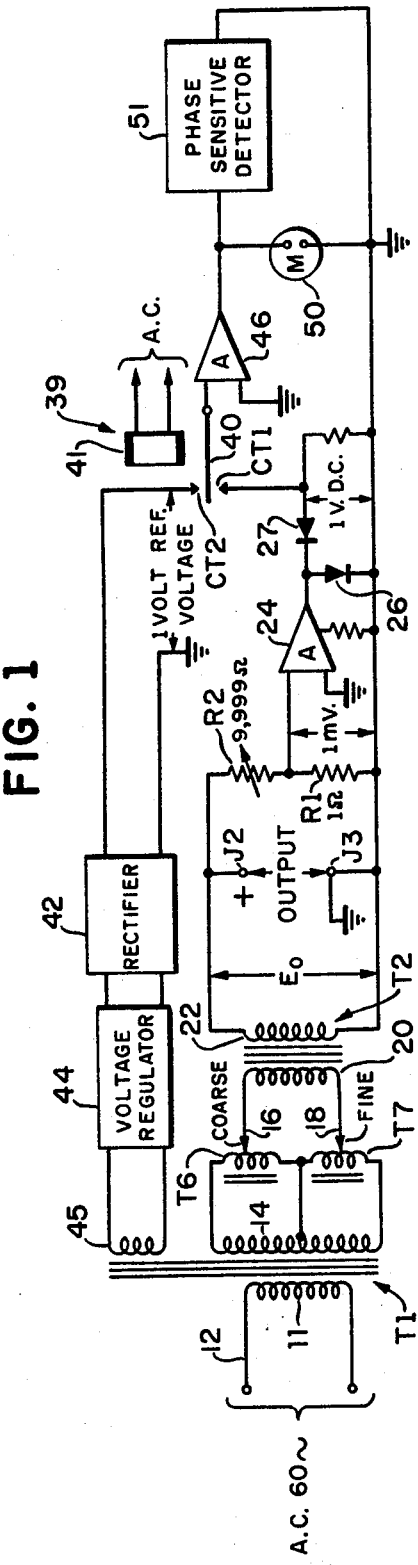
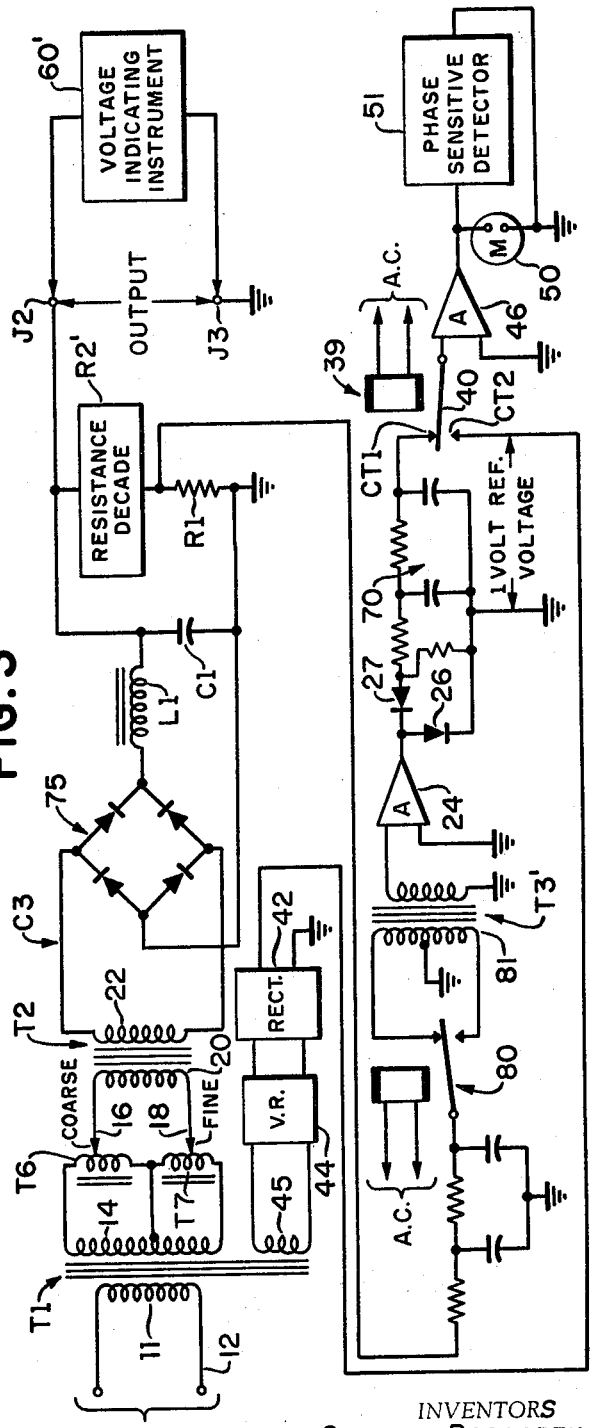
INVENTORS
SEYMOUR BOSWORTH
JEROME ZAUDERER
WILLIAM S. DOUGLAS
BY  J. B. Burke
ATTORNEY June 25, 1968   S. BOSWORTH ET AL   3,390,327
CALIBRATION DEVICE FOR ELECTRICAL INSTRUMENTS HAVING AN
ERROR PERCENTAGE INDICATOR
Filed Nov. 5, 1964   3 Sheets-Sheet 2

INVENTORS
SEYMOUR BOSWORTH
JEROME ZAUDERER
WILLIAM S. DOUGLAS
BY  J. B. Burke
ATTORNEY

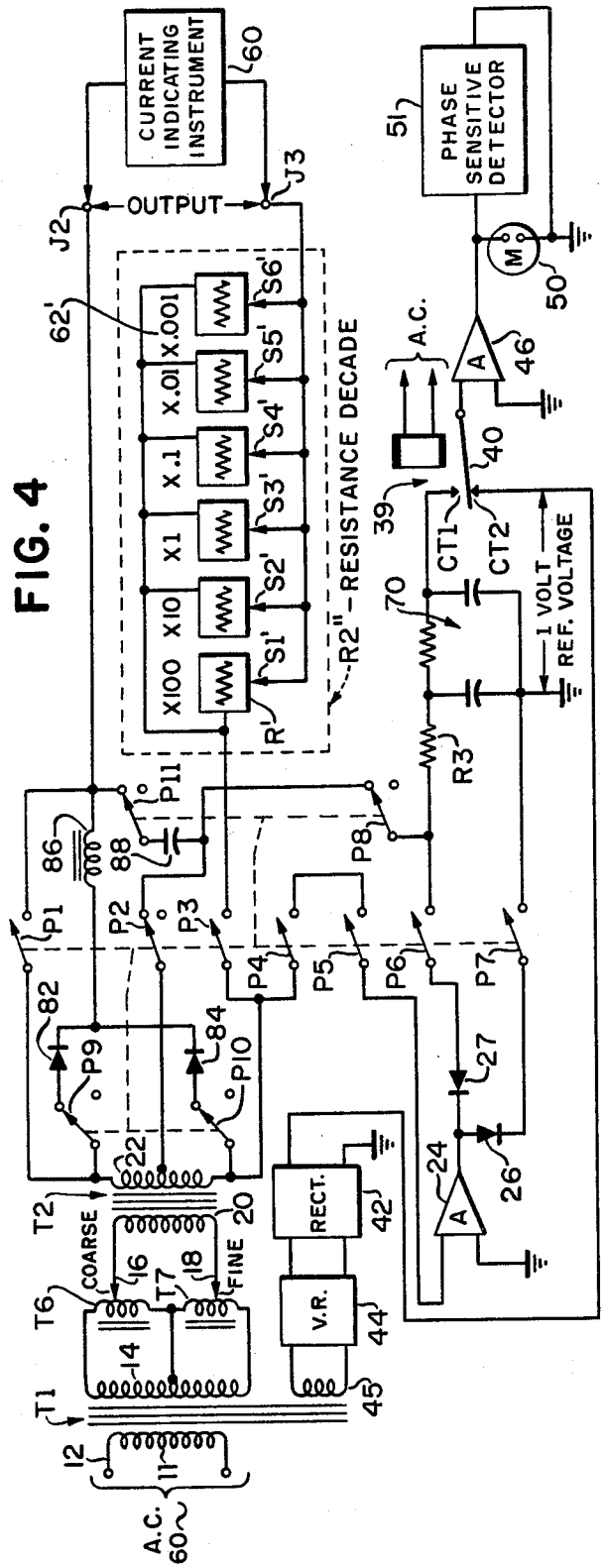
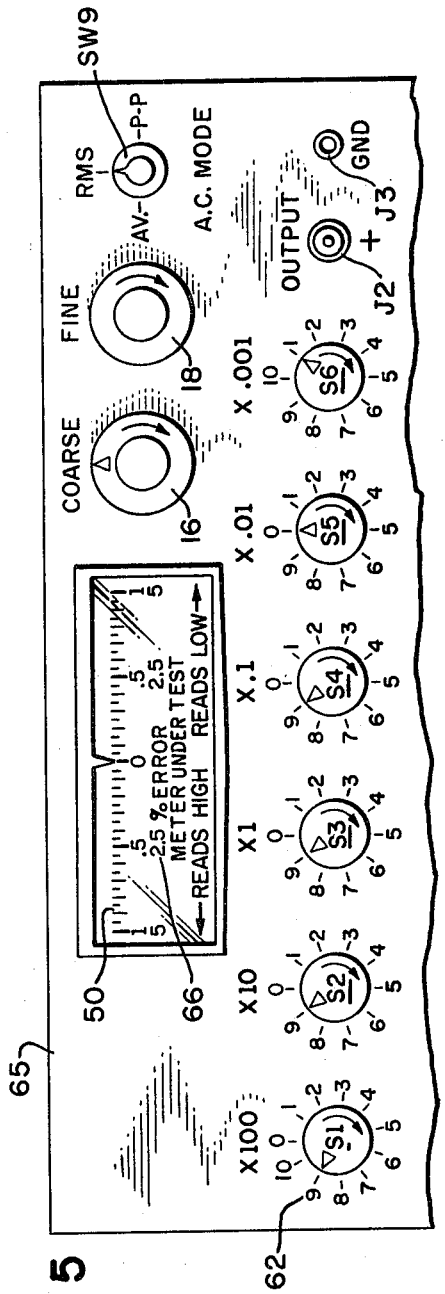

> United States Patent Office 3,390,327
Patented June 25, 1968

3,390,327
CALIBRATION DEVICE FOR ELECTRICAL INSTRUMENTS HAVING AN ERROR PERCENTAGE INDICATOR
Seymour Bosworth, Plainview, Jerome Zauderer, Brooklyn, and William S. Douglas, Centerport, N.Y., assignors to Abbey Electronics Corp., Carle Place, N.Y., a corporation of New York
Filed Nov. 5, 1964, Ser. No. 409,256
18 Claims. (Cl. 324—74)

This invention concerns a test device including circuits for testing and calibrating instruments that measure voltage, current and resistance.

The invention can be used to test oscilloscopes, multimeters, vacuum tube voltmeters, graphic recorders, panel meters, alternating and direct current ammeters, A.C. and D.C. voltmeters, ohmmeters, etc.

According to the invention, there is provided a calibration device in which is a circuit including a meter having a scale with a zero or null reading scale and with further readings calibrated in percentage values higher and lower than the null reading. The device further includes a resistance decade with a scale providing direct numerical readings. The decade includes an assembly of resistors which can be set by switching means to any desired resistance value. The device further includes coarse and fine controls for adjusting its voltage or current output. When an external instrument to be tested is connected to output terminals of the device, the resistance decade and controls can be adjusted so that the percentage indicating meter of the device is at the null reading. At this point the numerical reading of the resistance scale represents the actual voltage or current at the output terminals of the device, which reading can be compared with the reading of the meter or instrument under test for calibration purposes. Alternatively the resistance decade having been set to a given numerical value, the coarse and fine output controls may be adjusted until the instrument under test indicates a value of voltage or current corresponding to the numerical value to which the resistance decade has been set. The percentage indicating meter of the calibration device will then indicate directly the percentage error in the reading of the external instrument, since at this point the decade scale is indicating the nominal output of the device rather than its actual output, while the percentage meter is indicating the percentage difference between the actual output of the calibration device and the reading on the external instrument. The device includes a selector switch so that when the device is being used to perform an A.C. voltage calibration function, calibration can be selectively performed in terms of root-mean-square (RMS), average or peak-to-peak voltage values. The selector switch is connected in circuit with a feedback circuit of an amplifier employed in the device. The switch connects different resistors into the feedback circuit to change the gain of the amplifier so that the different voltage values mentioned are obtained when the A.C. voltage calibration is performed.

The calibration device also contains a switching device by means of which the internally generated voltage or current is removed from the output terminals and instead the resistance decade is connected between the output terminals, thus making it possible to use the calibration device as a precision resistance decade box.

In the calibration device is a circuit wherein a standard voltage is generated at each setting of the resistance decade and controls. This standard voltage is compared with a reference voltage, and the difference if any between the two voltages is applied to the percentage indicating meter.

It is a principal object of the invention to provide a calibration and instrument testing device including a percentage indicating meter which provides direct reading of percentage error in the reading of an external instrument connected to the device for test.

A further object is to provide a calibration and testing device as described which can serve as a secondary standard providing accurate, known outputs of voltage, current or resistance.

Another object is to provide a calibration and testing device including a resistance decade having a numerical scale or scales indicating nominal voltage or current output of the device while a percentage meter in the device indicates percentage difference between the nominal output and the actual output of the device.

Another object is to provide a test device as described, wherein for each output of the device a standard voltage is generated and compared with a reference voltage, the difference in voltage between the compared voltages being indicated in numerical percentage by a meter to which the voltage difference is applied to the device.

Another object is to provide selection means in the calibration and instrument testing device so that when A.C. voltage calibration is being performed, calibration can be done in terms of RMS, average or peak-to-peak voltage values.

The invention will be better understood in connection with the following detailed description taken together with the drawings, wherein:

FIG. 1 is a simplified schematic representation of a calibration circuit, used to explain basic principles of the invention.

FIG. 3 is a simplified schematic diagram of a calibration circuit useful for test purposes involving D.C. voltage.

FIG. 4 is a simplified schematic diagram of a calibration circuit useful for test purposes involving alternating and direct current.

FIG. 5 is a front view of part of a control panel of a calibration and testing device according to the invention.

Figure 2:
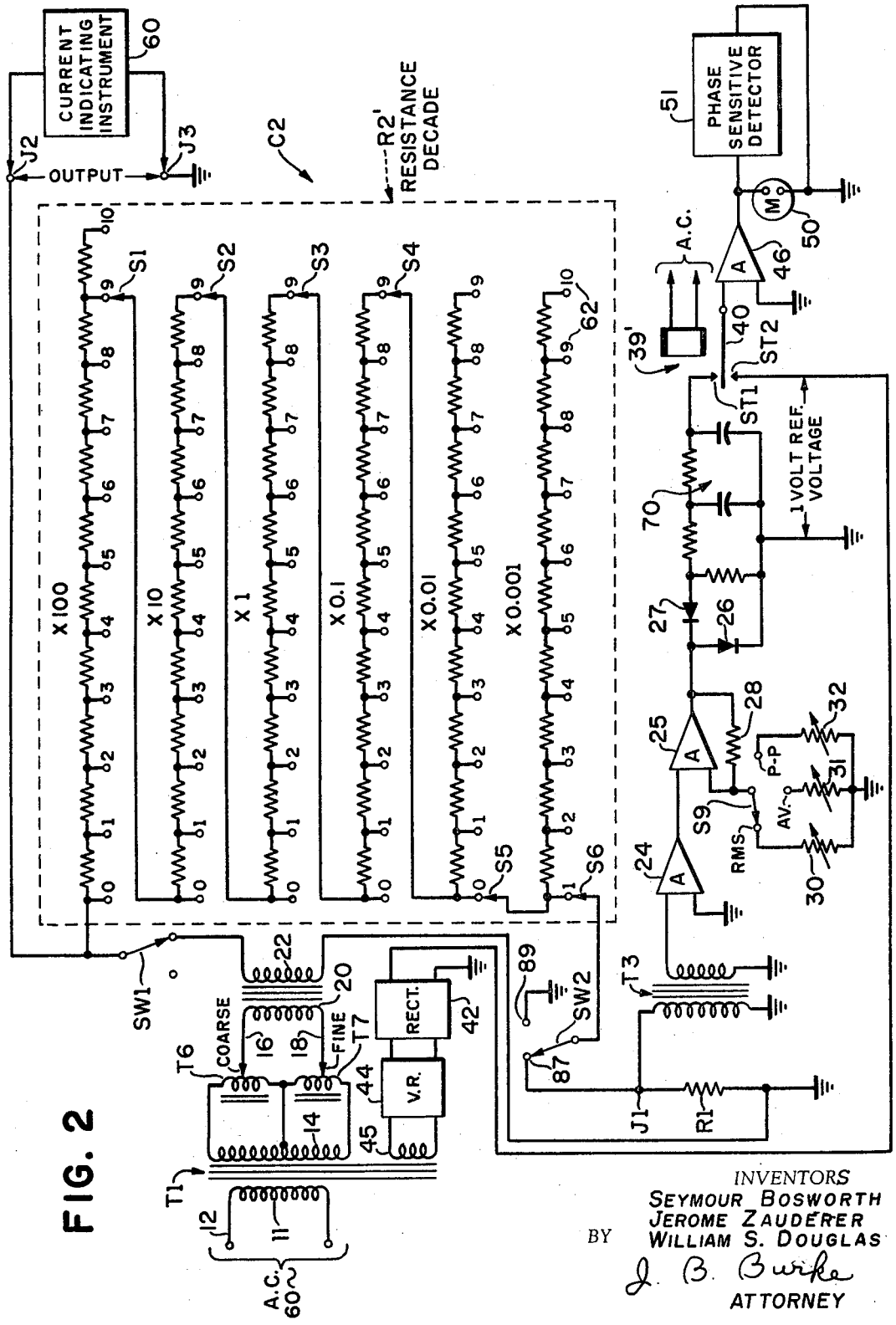
FIG. 2 is a simplified schematic diagram of a calibration circuit useful for test purposes involving A.C. voltage.

Referring first to FIG. 1, there is shown circuit C1 which illustrates certain basic principles of the invention. The circuit includes a transformer T1 whose primary winding 11 may be connected to a suitable alternating current power supply via power line 12. The transformer has a tapped secondary winding 14 across which are connected autotransformers T6, T7. Adjustable coarse and fine controls 16, 18 are connected to primary winding 20 of the transformer T2. The coarse and fine controls 16, 18 tap variable voltages from the autotransformers T6, T7 respectively. The output of transformer secondary winding 22 appears between high voltage terminal J2 and ground terminal J3. A voltage divider consisting of series resistors R1, R2 is also connected across secondary winding 22 in parallel with the output terminals J2, J3. At junction J1 of the resistors is connected the input of amplifier 24. The output of the amplifier is applied to rectifiers 26, 27. Rectifier 26 is connected to ground. Rectifier 27 is connected to terminal CT1 of a chopper 39 driven by applied alternating voltage. Chopper arm 40 is reciprocated by solenoid 41 of the chopper. Terminal CT2 of the chopper is connected to a fixed D.C. reference voltage source which may be a rectifier 42 rectifying the output of a voltage regulator 44 driven by another secondary winding 45 of transformer T1.

Another amplifier 46 is connected to chopper arm 40. The output of amplifier 46 is applied to a meter 50 through a phase sensitive detector 51. Meter 50 may have a scale calibrated to read percentage reading above and below a null or zero reading.

Chopper 39 forms part of a comparison circuit for comparing the standard voltage applied at terminal CT1 with the reference voltage applied at terminal CT2. The comparison circuit also includes an amplifier 46 and a phase sensitive detector 51. The detector 51 has a voltage output which is proportional in magnitude to the difference in magnitudes of voltages applied alternately from the chopper to the input of the detector via amplifier 46. The polarity of the detector output is positive or negative depending on whether the standard voltage is higher than the reference voltage or vice versa. Calibration meter 50 connected across detector 51 indicates the voltage output thereof. The meter has a scale which is calibrated in percentage reading above and below a null or zero reading. At the null or zero reading the standard and reference voltage are equal in magnitude. At readings other than null or zero the percentage reading is indicative of the percentage difference between the reference and standard voltage applied to the comparison circuit.

The voltage input to amplifier 24 is taken across resistor R1. Controls 16, 18 can be adjusted to determine the voltage appearing across the secondary winding 22 and the output terminals J2, J3 independently of the value of resistor R2 which is variable independently of controls 16, 18 and is connected in series with resistor R1; the series combination of resistors R2 and R1 being in parallel with the output terminals.

The gain of amplifier 24 may be set so that its rectified output is 1-volt D.C. when its input is 1-millivolt RMS. In this circuit condition, the meter 50 indicates the difference if any between the output voltage of amplifier 24 and the reference voltage set at 1-volt applied to chopper terminal CT2. Chopper arm 40 oscillates between the two terminals CT1, CT2 to apply the compared voltages to the meter. The voltage applied to terminal CT1 is a standard voltage in the circuit.

Referring to FIG. 1, for any given values of resistors R1 and R2, if the controls 16, 18 are not set so that the output voltage $E_o$ (in millivolts) appearing at the output terminals J2, J3 is such that:

$$\frac{R1}{R1+R2} \times E_o = 1 \text{ or } \frac{E_o}{1} = \frac{R1+R2}{R1}$$

then the percentage difference between the rectified output of amplifier 24 and the 1-volt reference voltage will be directly indicated on the meter. This percentage difference is identical to the percentage difference between output voltage $E_o$ and the ratio $$\frac{R2+R1}{R1}$$

Thus the circuit, by comparing standard and reference voltages, operates to compare the output voltage appearing at terminals J2, J3 with the resistive ratio $$\frac{R2+R1}{R1}$$

Circuit C1 is arranged for producing an alternating voltage at output terminals J2, J3. It is possible to produce a D.C. voltage at these terminals by rectifying the alternating voltage as will be explained below in greater detail. It is also possible to adapt the basic operating principles of circuit C1 for producing alternating or direct currents.

FIG. 2 shows circuit C2 which may be used for performing A.C. voltage calibration functions with respect to a voltage reading instrument 60 under test connected to circuit output terminals J2, J3. Circuit C2 is similar to to circuit C1 and corresponding parts are identically numbered. Circuit C2 embodies the same basic operating principles as circuit C1 including comparison of standard and reference voltages. Part of circuit C1, namely resistor R2, has been replaced in circuit C2 by a resistance decade R2' having a plurality of control switches or taps S1–S6 settable at strings of resistors R to produce any desired resistance value between terminals or points J1, J2. The resistance decade has a numerical scale 62 which is calibrated for direct reading so that the true voltage output at terminals J2, J3 can be read directly when the controls 16, 18 are adjusted to produce a zero or null reading on meter 50. The resistance decade is connected in parallel with output terminals J2, J3.

Amplifier 25 has a feedback resistor 28 connected between its output and input. A three-position selector switch S9 is connected in the feedback circuit and is arranged to connect any one of three variable resistors 30, 31, or 32 in the feedback circuit to determine the gain of the amplifier. The three resistors have different resistance ranges. The switch has three positions designated respectively RMS, AV and P—P. At these three positions respectively the switch selects such resistor combinations including resistor 28 and one of the three variable resistors, that the A.C. volts calibration function of circuit C1 is performed in terms of root-mean-square, average and peak-to-peak voltage values respectively.

FIG. 5 shows one possible arrangement of a control panel 65 for a calibration instrument in which circuit C2 is installed. The adjustable switches S1–S6 can be set for indicating any desired composite numerical reading on scale 62. The switches are shown set to read 999.91 on the scale. The scale 66 of meter 50 is calibrated to indicate percentage difference between the quantity set on the decade dials and the quantity appearing at output terminals J2, J3. Controls 16, 18 and output terminals J2, J3 are also provided on the panel. Selector switch S9 having three positions designated RMS, AV and P—P is provided at the control panel for selectively performing A.C. volts calibration in terms of root-mean-square, average and peak-to-peak voltage values respectively.

The A.C. voltage is taken across the standard fixed resistor R1 in circuit C2 and is applied to a transformer T3. Transformer T3 drives amplifier 24. The output of the amplifier is passed through rectifiers 26, 27 and smoothing filter 70 and is then applied to terminal CT1 of chopper 39'. The reference voltage from rectifier 42 is applied to terminal CT2 of the chopper. The voltage difference if any between the compared standard and reference voltages is amplified in amplifier 46 and is then applied to meter 50 through phase sensitive detector 51.

If the switches of the resistance decade are set to a particular reading and controls 16, 18 are adjusted so that the reading of meter 50 is at zero or null, then the setting of the switches S1–S6 at scale 62 indicates the true voltage output appearing at terminals J2, J3. If instrument 60 under test reads the same as scale 62 then there is no error in the reading of the instrument 60 under test. If the switches S1–S6 are set to a certain reading on scale 62 and if the controls 16, 18 are adjusted until the instrument 60 under test reads the same as the nominal reading of the scale 62, then meter 50 will indicate the percentage error if any between the actual A.C. voltage output of circuit C2 and the nominal voltage reading of the external instrument 60. Under the circuit arrangement described, scale 62 indicates the actual voltage output of circuit C2 only when meter 50 is a 0. At all other times it indicates a nominal voltage while meter 50 indicates the percentage difference between the actual voltage output of the circuit and the nominal reading on scale 62.

FIG. 3 shows circuit C3 which is substantially the same as circuit C2 and corresponding parts are identically numbered. Circuit C3 is arranged for calibrating or testing an external instrument reading D.C. voltage. The output at terminals J2, J3 is a D.C. voltage produced by a rectifier bridge 75 having two terminals connected to secondary 22 of transformer T2 and the other two terminals connected to filter L1, C1 which in turn is connected to terminals J2, J3 across the resistance decade R2' and standard resistor R1. Another chopper 80 is provided in the voltage comparison circuit for converting the D.C. voltage taken off resistor R1 to A.C. voltage. The primary winding 81 of transformer T3' is centertapped and balanced to ground. Meter 50 will indicate percentage error in the reading of voltage measuring instrument 60' under test when the scale reading of the decade R2' is the same as the reading of the external instrument as explaned in connection with circuit C2 above.

FIG. 4 illustrates a circuit C4 embodying the invention and arranged in a convertible manner so that it can be used for calibrating A.C. or D.C. current reading instruments. In circuit C4 parts corresponding to those of circuits C1–C3 are identically numbered and perform functions already described. Resistance decade R2" is arranged like decade R2' but is connected in series with output terminals J2, J3 of the circuit instead of in parallel with these terminals. The circuit includes a multiple pole switch having poles P1–P11 all ganged together for simultaneous operation. When poles P1–P7 are closed and poles P8–P11 are open, the circuit is used to calibrate A.C. current reading instruments. An alternating current reading instrument 60" connected to output terminals J2, J3 will serve as an external load for the current output of transformer T2 passing through the resistance decade R2". For any setting of the switches S1'–S6' of the resistance decade, when the alternating current applied to the meter load 60" equals the current reading of decade scale 62', a certain A.C. voltage is developed across the resistance decade and is amplified by amplifier 24, rectified by rectifiers 26, 27 and filtered by filter 70.

The standard voltage then appears at contact CT1 of chopper 39' and is compared with the reference voltage provided by rectifier 42. Meter 50 will then have a zero or null reading. If the setting of the resistance decade is such that the nominal current reading of the decade scale is higher or lower than the output current drawn by the instrument load 60", the meter 50 will indicate the percentage difference in the manner described above.

Circuit C4 can be used for D.C. current calibrating functions by opening the circuit at poles P1–P7 and closing the circuit at poles P8–P11 in the setting shown in FIG. 4. The circuit is then arranged to perform D.C. current calibration. The standard D.C. voltage developed across the resistance decade R2" is applied to input resistor R3 of filter 70 since amplifier 24 and rectifiers 26, 27 are then taken out of the circuit as poles P5, P6, P7 are open and pole P8 is closed. The D.C. voltage at the resistance decade is produced by the full wave rectifiers 82, 84 connected to opposite ends of secondary winding 22. The input to the resistance decade is taken from a center tap on secondary winding 22. The rectifier output is filtered by a choke coil 86 and a capacitor 88 connected in the output circuit when poles P9, P10 and P11 are closed and poles P1, P2, P3 are open.

The standard voltage applied to contact terminal CT1 of chopper 39' is compared with the reference voltage at contact terminal CT2 and meter 50 will indicate a null or zero reading if the direct current output drawn by the instrument load is the same as the reading indicated on scale 62.

The arrangement of the panel 65 shown in FIG. 5 is applicable to the circuits C3 and C4 as well as circuit C2, as explained above. It is possible to combine circuits C2 and C3 into a single circuit by use of suitable switches so that the circuit is convertible for D.C. or A.C. voltage calibration, in a manner analogous to that illustrated in FIG. 4 where the circuit is convertible to A.C. or D.C. current calibration. It is also possible to incorporate all the circuits C2, C3 and C4 into a single multiple purpose calibrator capable of serving as a secondary standard producing known alternating and direct currents and voltages.

It is possible by use of suitable switches to use the decade R2' of FIG. 2 alone as a secondary standard resistance decade. If the switch SW1 shown in FIG. 2 is opened, one terminal of the resistance decade will be connected to circuit terminal J2 while the transformer secondary winding 22 will be open circuited. The other terminal of the resistance decade will be grounded through switch SW2 which will be switched from contact 87 to contact 89. The resistance decade will then be connected directly across the output terminals J2, J3 of the circuit.

Although a limited number of embodiments of the invention have been illustrated, it will be understood that many circuit refinements may be introduced for various purposes without departing from the invention as defined by the appended claims.

What is claimed and sought to be protected by Letters Patent is:

1. A test circuit for calibrating an electric instrument, comprising:
   a variable source of voltage;
   circuit output terminals for connecting said instrument thereto;
   first circuit means connecting said source of voltage to said terminals for applying a voltage thereto;
   a resistance decade in circuit with said variable voltage source;
   switch means for setting said decade to various resistances;
   second circuit means connected to said resistance decade to take off a standard voltage related in magnitude to the resistance setting of said resistance decade;
   a decade scale on said resistance decade calibrated to indicate nominal circuit output;
   a source of fixed reference voltage;
   a calibration meter having a meter scale calibrated to read percentage differences proportional to voltages applied thereto; and
   voltage comparison means capable of producing a voltage output depending on the difference in magnitude of two voltages applied to its input,
      said source of reference voltage and said second circuit means being connected to the input of the voltage comparison means, said calibration meter being connected to the output of the voltage comparision means,
      whereby the calibration meter scale indicates the percentage difference between the nominal output indicated by the decade scale and the actual output applied to the circuit output terminals, and
      whereby the decade scale indicates the magnitude of output actually applied to the circuit output terminals when the calibration meter has a zero reading.

2. A test circuit for calibrating an electric instrument, according to claim 1, wherein:
   the instrument to be calibrated is an alternating voltage measuring device, and said variable source of voltage supplies alternating voltage to the output terminals;
   said resistance decade being connected in parallel with the circuit output terminals;
   said second circuit means including rectifier means for rectifying alternating voltage taken off said resistance decade; and
   said reference voltage source producing a fixed D.C. voltage for comparison with the rectified standard voltage.

3. A test circuit for calibrating an electric instrument, according to claim 1, wherein:
   the instrument to be calibrated is a D.C. voltage measuring device;
   said first circuit means including rectifier means for rectifying the alternating voltage;
   said resistance decade being connected in parallel with the circuit output terminals.

4. A test circuit for calibrating an electric instrument, according to claim 1, wherein:

said variable voltage source includes adjustable control means for varying the voltage applied to said first circuit means independently of the setting of the resistance decade, so that the nominal reading of the decade scale differs from the actual output at the circuit output terminals when the calibration meter scale has a reading other than zero.

5. A test circuit for calibrating an electric instrument, according to claim 1, wherein:

said variable source of voltage supplies alternating voltage; and further comprising:

variable autotransformers for varying the circuit output independently of the setting of the resistance decade, so that the nominal reading of the decade scale differs from the actual circuit output when the calibration meter scale has a reading other than zero.

6. A test circuit for calibrating an electric instrument, according to claim 1, wherein:

the instrument to be calibrated is a D.C. voltage measuring device;

the first circuit means applies D.C. voltage to the circuit output terminals;

the variable source of voltage includes adjustable control means for varying the circuit output voltage independently of the setting of the resistance decade, so that the nominal reading of the decade scale differs from the actual circuit output voltage when the calibration meter scale has a reading other than zero.

7. A test circuit for calibrating an electric instrument, according to claim 6, wherein:

said variable source of voltage produces alternating voltage; and said first circuit means includes a rectifier for converting the alternating voltage to D.C. voltage for application to the circuit output terminals.

8. A test circuit for calibrating an electric instrument, according to claim 1, wherein:

the instrument to be calibrated is an alterating current measuring device and provides a load at the circuit output terminals;

said resistance decade being connected in series circuit with the circuit output terminals for sensing alternating current passing through the load;

the decade scale indicating the magnitude of current actually passing through the load when the calibration meter has a zero reading;

the calibration meter scale indicating percentage difference between the nominal current indicated by the decade scale and the actual output current passed through the load when the calibration meter scale has a reading other than zero.

9. A test circuit for calibrating an electric instrument, according to claim 1, wherein:

the instrument to be calibrated is a direct current measuring device and provides a load at the circuit output terminals;

said resistance decade being connected in series circuit with the circuit output terminals for sensing direct current passing through the load;

said first circuit means including rectifier means for rectifying voltage produced by said variable source of voltage;

said variable voltage source including control means, so that the voltage applied to the first circuit means is variable in magnitude independently of the setting of said resistance decade, whereby the calibration meter scale indicates percentage difference between the nominal current indicated by the decade scale and the actual output current passed through said load when the calibration meter scale has a reading other than zero, and whereby the decade scale indicates the magnitude of current passing through the load when the calibration meter scale has a zero reading.

10. A test circuit for calibrating an electric instrument, according to claim 1, wherein:

the voltage comparison means includes a chopper and a phase sensitive detector in circuit with the calibration meter; and another chopper for applying the reference and standard voltages alternately to said detector.

11. A test circuit for calibrating an electric instrument, according to claim 1, wherein the test circuit further comprises:

an amplifier in said second circuit for amplifying said standard voltage, said amplifier having a feedback circuit connected between input and output of the amplifier;

and adjustable resistance means connected to the feedback circuit for selectively adjusting the gain of the amplifier to three predetermined levels, so that the magnitude of output indicated by the decade scale is selectively determined in terms of root-mean-square values, average value, and peak-to-peak value.

12. A test circuit according to claim 11, wherein:

the instrument to be calibrated is an alternating voltage measuring device and said variable source of voltage supplies alternating voltage to the output terminals;

said resistance decade being connected in parallel with the circuit output terminals;

said second circuit means including rectifier means for rectifying alternating voltage taken off said resistance decade; and said reference voltage source producing a fixed D.C. voltage for comparison with the rectified standard voltage.

13. A test circuit according to claim 11, wherein:

said variable source of voltage includes adjustable control means for varying the voltage applied said first circuit means independently of the setting of the resistance decade, so that the nominal reading the decade scale differs from the actual output at the circuit output terminals when the calibration meter scale has a reading other than zero.

14. A test circuit according to claim 11, wherein:

said variable source of voltage supplies alternating voltage; and further comprising:

variable autotransformers for varying the circuit output independently of the setting of the resistance decade, so that the nominal reading of the decade scale differs from the actual circuit output when the calibration meter scale has a reading other than zero.

15. A test circuit according to claim 3, wherein:

said second circuit means includes means for converting D.C. voltage taken off from said resistance decade to alternating voltage; and means for amplifying and rectifying the last named alternating voltage to produce a standard D.C. voltage, said reference voltage being a D.C. voltage, whereby said voltage comparison means compares the two D.C. voltages.

16. A test circuit according to claim 15, wherein said voltage comparison means includes a phase sensitive detector and a chopper for applying the standard and reference voltages alternately to said detector.

17. A test circuit according to claim 8, wherein:

said second circuit means includes rectifier means for converting alternating voltage taken off said resistance decade to standard D.C. voltage, said reference voltage being a D.C. voltage; and
said voltage comparison means including a phase sensitive detector and a chopper for applying said reference D.C. voltage and said standard D.C. voltage alternately to said detector.

18. A test circuit according to claim 9, wherein:
said second circuit means includes means for filtering and smoothing the voltage taken off said resistance decade to produce a standard D.C. voltage; and
said voltage comparison means includes a phase sensitive detector and a chopper for applying said reference voltage and said standard voltage alternately to said detector.

No references cited.

RUDOLPH V. ROLINEC, *Primary Examiner.*

E. L. STOLARUN, *Assistant Examiner.*